Nov. 30, 1937. W. F. GLASS ET AL 2,100,951
FILTER
Original Filed Sept. 5, 1935
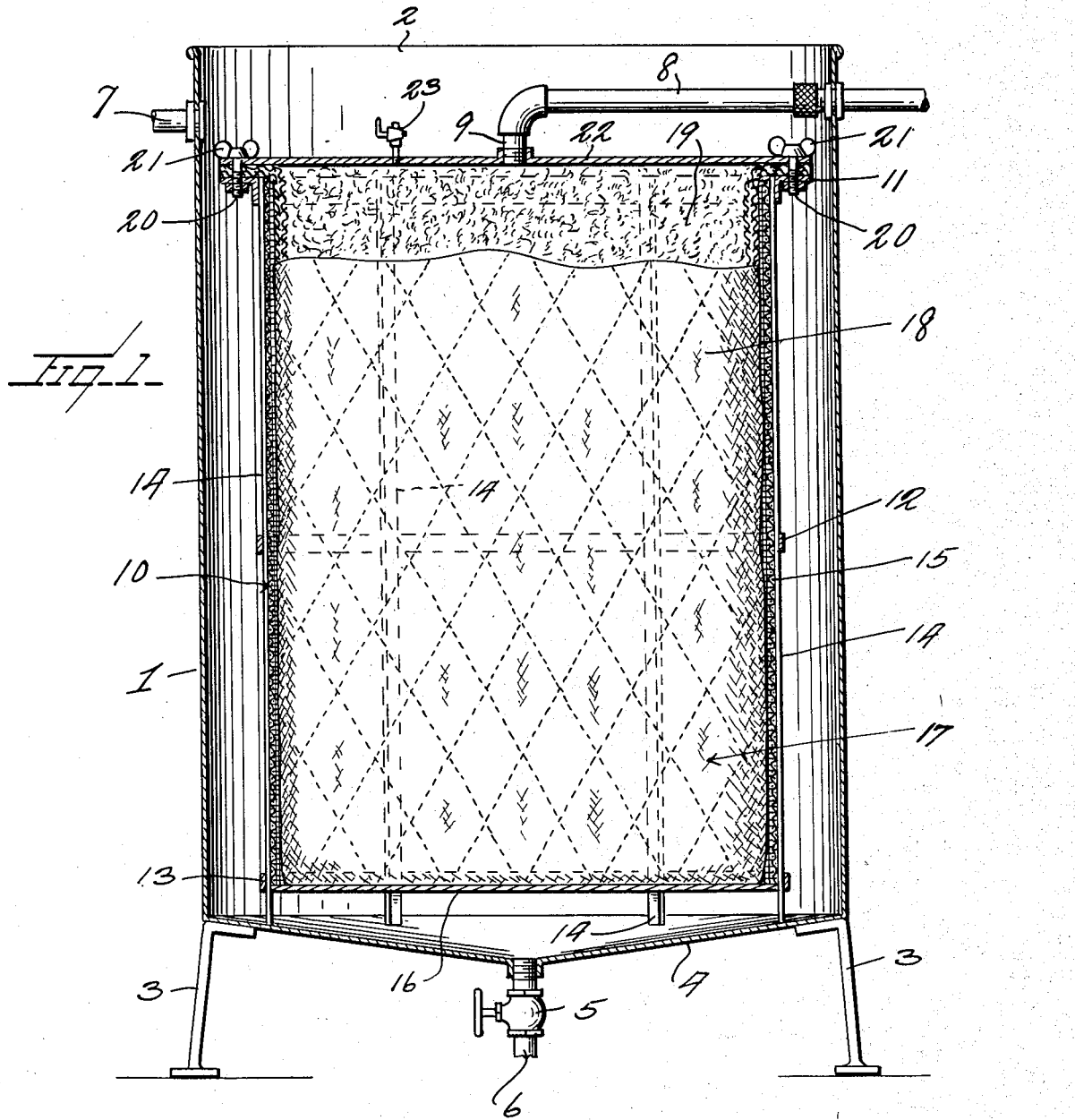
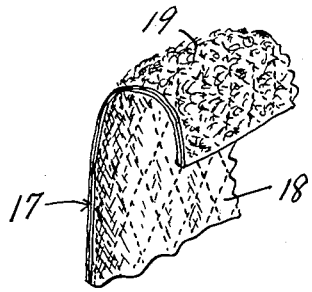
Inventors
W. F. Glass
+ M. G. Sibley
By Watson E. Coleman
Attorney Patented Nov. 30, 1937

2,100,951

UNITED STATES PATENT OFFICE 2,100,951

FILTER

Willie F. Glass and Milton G. Sibley, Gulfport, Miss.

Application September 5, 1935, Serial No. 39,330
Renewed February 25, 1937

1 Claim. (Cl. 210—183)

This invention relates to the class of liquid purification and pertains particularly to improvements in filtering devices.

The primary object of the invention is to provide an improved type of filter structure employing a filtering powder in association with a bag, in which novel means is employed for preventing the sagging or collapsing of the filter powder on the bag material when the filter is drained or is not in use.

Another object of the invention is to provide an improved filter structure having a novel means for maintaining the filtering bag in operative position therein and for facilitating the draining of the bag.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a view in vertical section through the filter structure embodying the present invention.

Figure 2 shows a portion of the two ply cloth from which the filter bag is formed.

Referring now more particularly to the drawing wherein like numerals of reference designate corresponding parts throughout the several views, the numeral 1 indicates the housing or outer portion of the filter structure which preferably has an open top 2 and may be supported upon legs 3 so as to give clearance for the depressed or sump like bottom 4, which is provided with a valved outlet 5, which provides a drain means for connection with a suitable drain pipe 6.

Adjacent the top of the housing, an outlet pipe 7 is connected and extending through the housing wall at approximately the same elevation as the outlet pipe, is an inlet pipe 8 which extends to the center of the housing and to a downwardly directed pipe section or nipple 9.

Disposed centrally within the housing is a frame structure 10 which may be constructed of any suitable material and which, in the form here illustrated, comprises a top annulus 11 and the intermediate and lower annuli or rings 12 and 13 secured to spaced vertical members 14. These members 14 extend below the lower ring or annulus 13 to form supporting legs which rest upon the bottom 4 of the housing. The interior of the basket is lined from the top to the bottom with a screen wire of small mesh, which is indicated by the numeral 15, while the bottom of the basket is closed by a sheet or body of solid material, which is indicated by the numeral 16. Disposed within the basket against the inner side of the screen wire 15 is a fabric bag 17 of a novel design for retaining a layer of filter powder over the interior sides and bottom of the basket. A portion of this bag 17 is illustrated in Figure 2 and as shown comprises two plies of material. The outer ply is in the form of a relatively closely woven fabric 18, such as lightweight canvas, while the inner ply, which is indicated by the numeral 19, comprises a fabric having a heavy nap or roughened surface such as the material commonly known as turkish toweling. These plies of the bag are stitched together, preferably like quilting, with the stitches running in crossed relation in the manner illustrated in Figure 1.

This bag when placed within the basket has the closely woven fabric 18 against the wire 15 so that the rough fabric forms the inner wall of the bag and provides a means of trapping and retaining particles of filter powder material which may be brought into contact therewith with the liquid which passes through the bag.

The top edges of the bag is turned outwardly over the top annulus 11 which is relaitvely wide and may be provided with upwardly extending screws 20 for the reception of wing nuts or thumb screws 21. After turning out the top edge of the bag there is then placed over the top of the basket the cover plate 22 which has suitable apertures to receive the screws 20 and which is held down in place by the nuts 21. This cover plate 22 has a central threaded opening in which the nipple 9 is engaged and in addition a petcock controlled pipe 23 by means of which air may be let into the bag when it is desired to drain the same.

In the use of the present filter, when a new bag is put into the screen basket the housing is filled with clean liquid by means of the pipe 8. A solution of filter powder is then pumped into the bag through the pipe and the pressure carries the powder over the surface 19 of the same where it will cling to the roughened material thereof. The structure is then ready for use and any dirty solvent pumped through the pipe 8 into the filter basket will be forced through the bag and basket, reaching the outside of the basket in clean condition and leaving the dirt in the basket where it will settle to the bottom of the same. By providing the central inlet for the dirt carrying solvent at the top of the filter basket, the liquid will enter without creating a great amount of disturbance and therefore the dirt of the solvent liquid will gradually settle while the liquid will pass off through the powder filled wall of the bag and flow out through the pipe 7.

The filter powder referred to is any suitable commercial filter powder which may be obtained on the market for use in filter bags.

While such powders have previously been used in fabric bags, the bags are always smooth on the inner surface so that it is necessary to provide a means for agitating the liquid therein so that the powder will be kept distributed over the surface of the bag. When the filter is not in use or when the liquid is drawn from the housing for any purpose the wall of filter powder adhering to the fabric bag will sag and slide to the bottom of the bag. In the present invention, by the use of the rough surface on the inside of the bag, the powder will be packed into the roughened surface and will not leave the same when the liquid is still or when it is drawn off.

While the receptacle 1 has been shown as having an open top, it will, of course, be understood that a cover may be applied thereto if found necessary to keep out dust or other foreign matter.

We claim:—

In a filtering device in which a filtering powder is used, an outer receptacle, an inner receptacle comprising a bottom, a plurality of vertical standards surrounding said bottom, a plurality of annular bands surrounding said standards and secured thereto in vertical spaced relation, the upper one of said bands having an integral outwardly directed flange, a vertical screen wall resting upon said bottom and positioned against the inner sides of said standards and terminating at said top band, a removable cover plate overlying said top band and the flange thereof, means for coupling said cover plate with said flange, means for introducing fluid into the strainer structure through said cover plate, and a cloth strainer bag within the strainer structure and having its top edge clamped between said cover plate and said flange, said bag being made up of an outer hard woven cloth and an inner rough soft woven cloth of the character of turkish toweling against the inner surface of which the said filtering powder clings to form a filtering body.

WILLIE F. GLASS.
MILTON G. SIBLEY.